May 8, 1945.  B. STECHBART ET AL  2,375,706
SLIDE PROJECTOR APPARATUS
Filed June 17, 1942    6 Sheets-Sheet 6
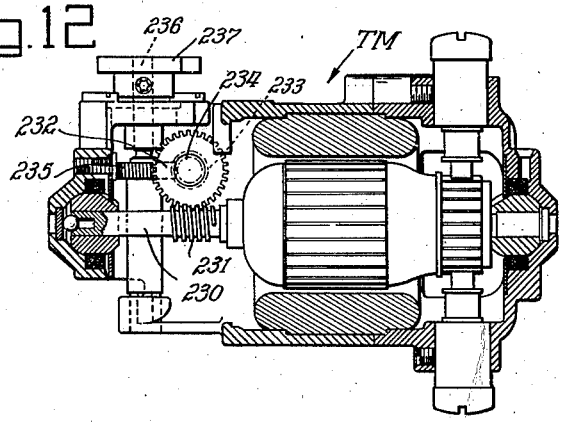
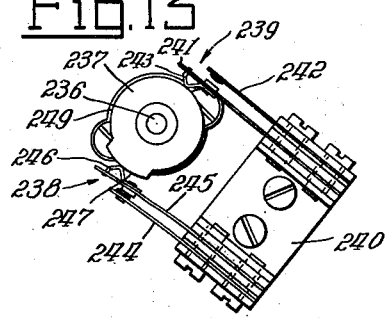 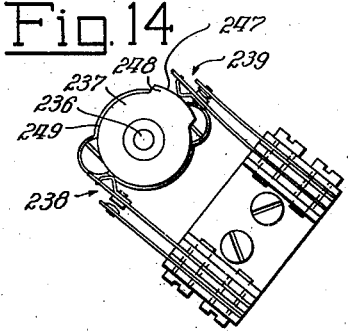
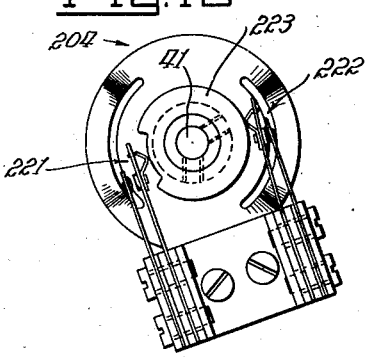 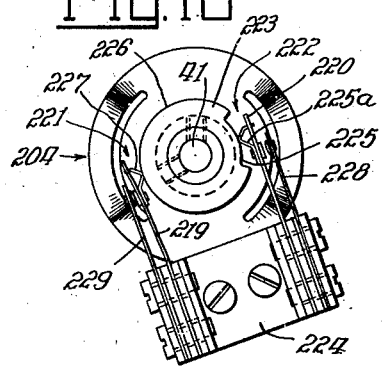
INVENTORS
BRUNO STECHBART
EDWARD E. STRAUSS
BY *Robert F. Mihle jr.*
ATTY.

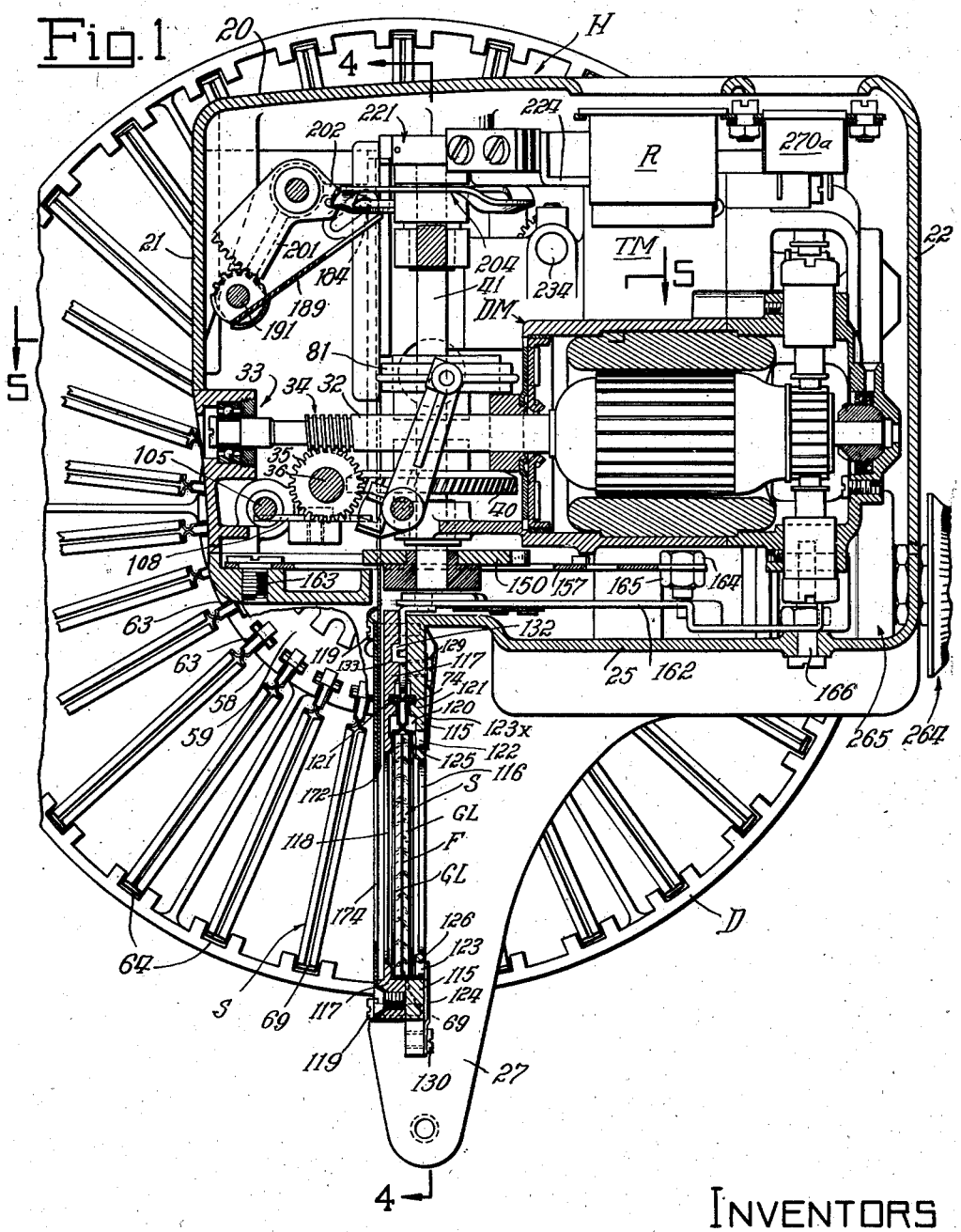

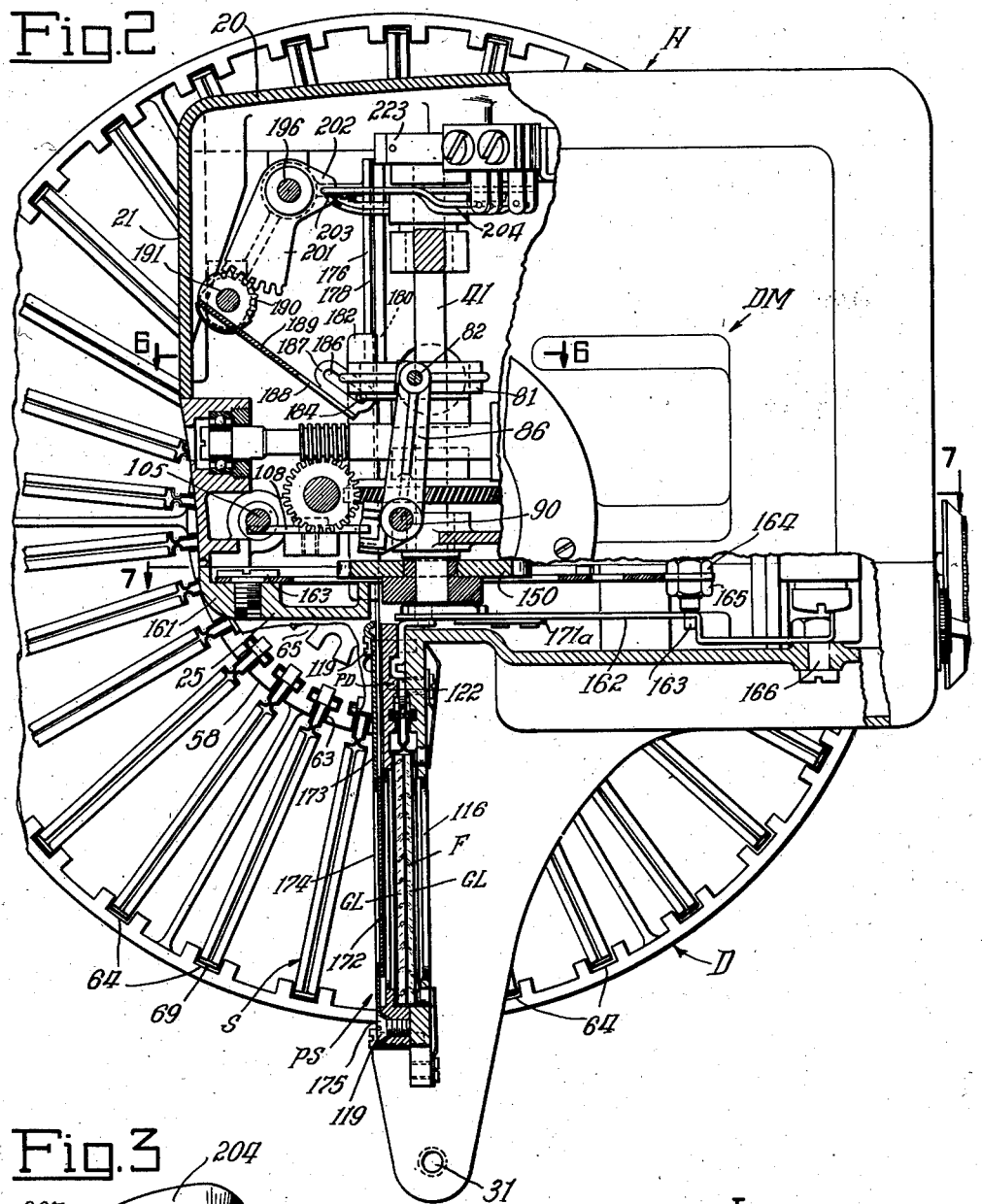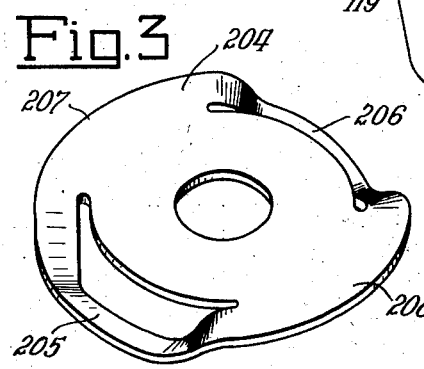

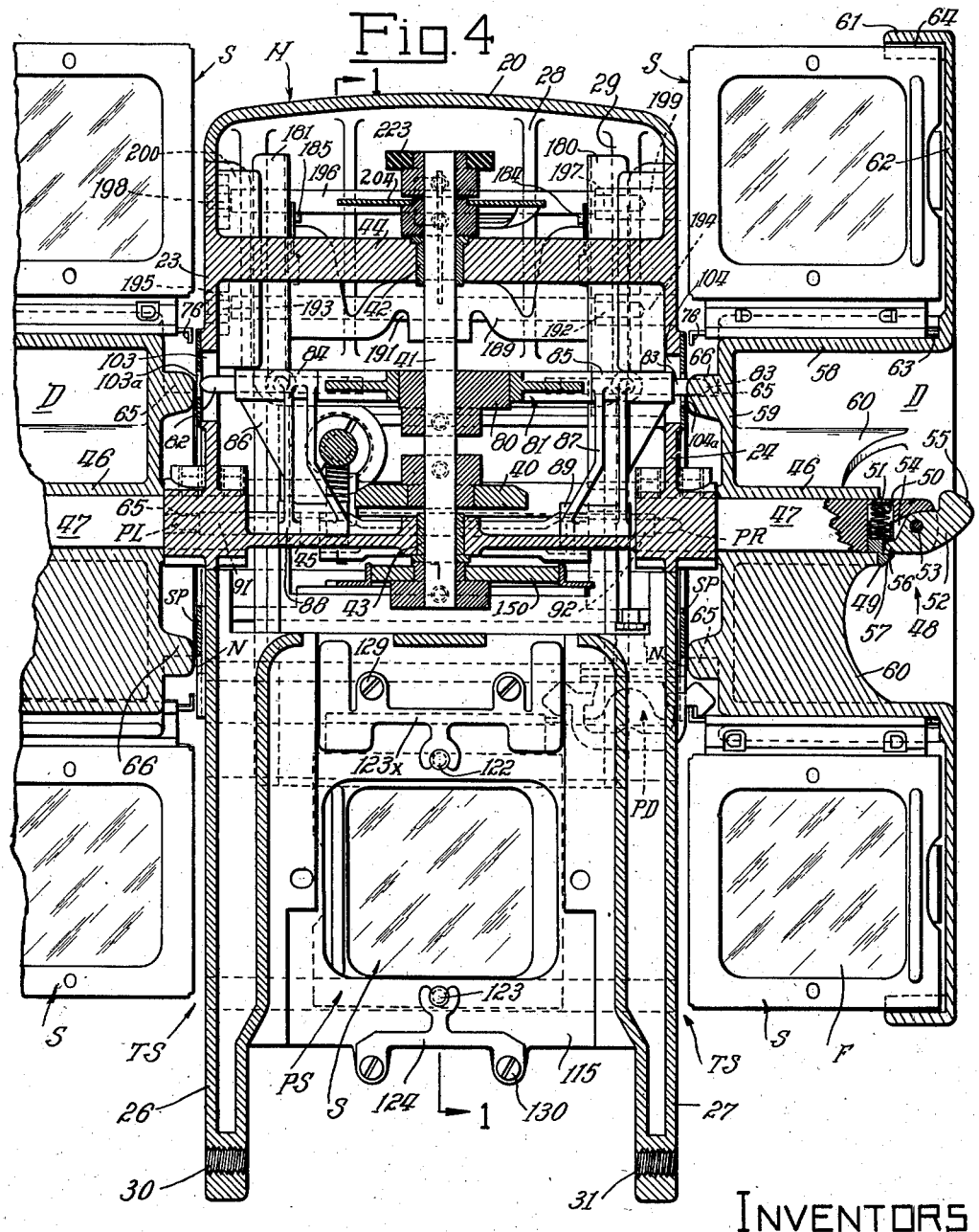

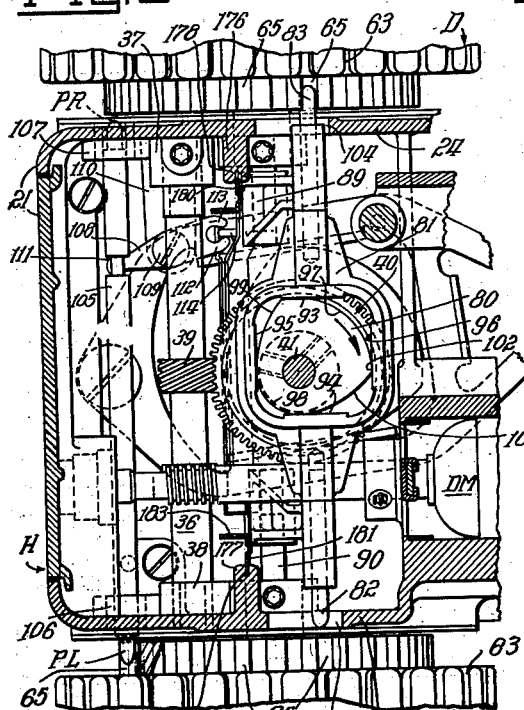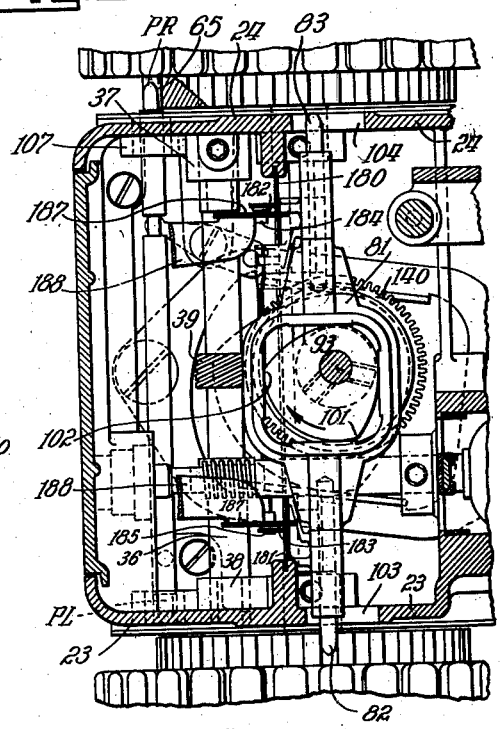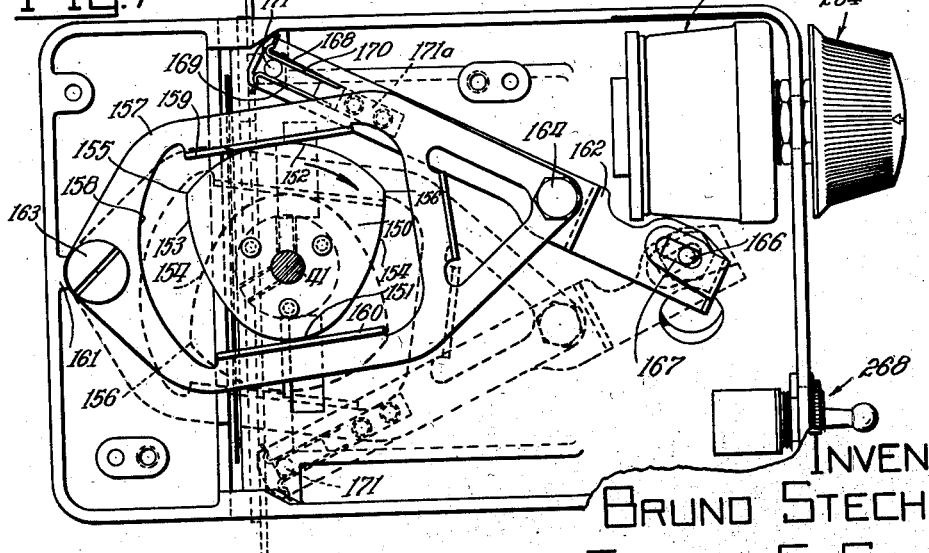

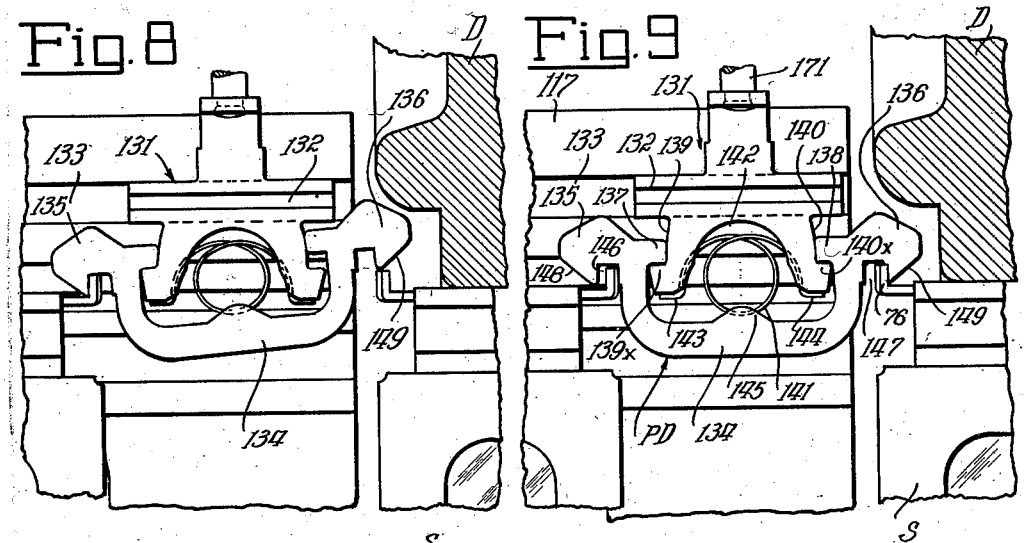
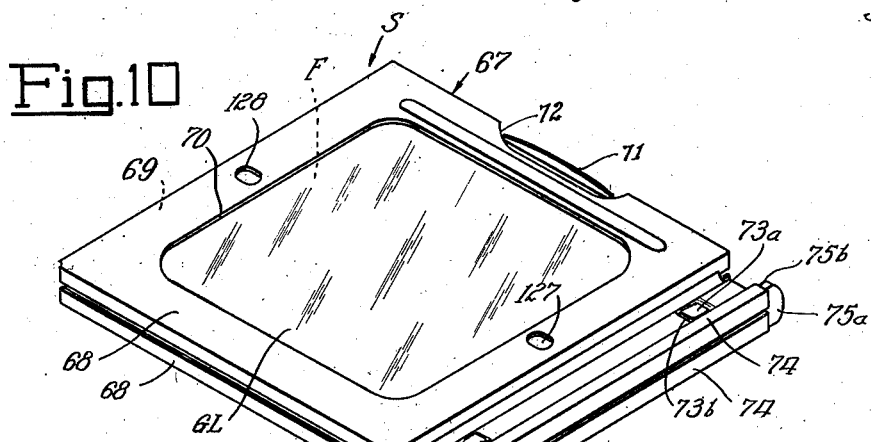
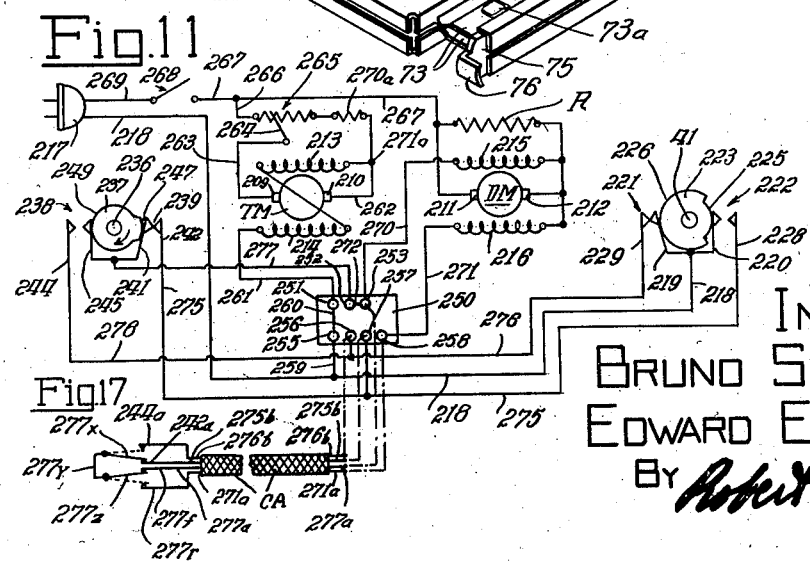

Patented May 8, 1945

2,375,706

UNITED STATES PATENT OFFICE 2,375,706

SLIDE PROJECTOR APPARATUS

Bruno Stechbart, Park Ridge, and Edward E. Strauss, Wilmette, Ill., assignors to The Bell & Howell Company, Chicago, Ill., a corporation of Illinois Application June 17, 1942, Serial No. 447,316

12 Claims. (Cl. 88—28)

Our invention relates more particularly to projector apparatus of the character wherein graphic subject matter photographically produced as upon slides is projected upon a viewing screen by means of a light beam.

The general object of this invention is the provision of a novel and effective projector or viewing apparatus automatically operable to run through a series of slides in a holder or carrier therefor by transferring them from a transfer station, at which they are successively disposed by such holder, into a projecting or viewing section of the apparatus, and, subsequent to individual projection or viewing thereof for a desired or predetermined period, returning the same to the holder preparatory to like transfer and return of succeeding slides as they are disposed at the transfer station, such object further including the provision of a driving motor for the apparatus together with timing means controlling the length of time the apparatus allows the slides to remain in the projecting or viewing section, and also a plurality of slide holders or carriers from which the slides are alternately transferred and returned as aforesaid.

The invention will be better understood by reference to the accompanying drawings, in which—

Fig. 1 is a transverse sectional view taken vertically through a projector machine constructed according to the principles of the invention, the view being taken upon the line 1—1 in Fig. 4;

Fig. 2 is a view similar to Fig. 1 but showing the parts of the machine in a different position of operation;

Fig. 3 is a perspective view of a cam plate for operating a shutter of the machine;

Fig. 4 is a vertical sectional view taken axially through the machine upon a plane at right angles to that upon which Figs. 1 and 2 are taken, and substantially as indicated at the line 4—4 in Fig. 1;

Fig. 5 is a horizontal fragmentary sectional view taken substantially upon the line 5—5 in Fig. 1;

Fig. 6 is a view taken similarly to Fig. 5 but showing several of the parts in a different operating position;

Fig. 7 is a horizontal sectional view taken on the line 7—7 of Fig. 2;

Fig. 8 is an enlarged view illustrating, in elevation, a slide picker device for transferring slides to and from slide holding drums of the machine;

Fig. 9 is a view like Fig. 8, showing the picker device in coupling relation with slides at either end thereof and of which the leftmost slide is in the projecting section of the machine and of, which the rightmost slide is at a transfer station and still contained within its respective slide holder;

Fig. 10 is a perspective view showing the details of a slide, together with a transparency contained therein, of a form adapted to be handled automatically by the machine;

Fig. 11 is a diagrammatic view illustrating driving and timing motors for the machine together with an electric control circuit therefor;

Fig. 12 is a sectional view of the timing motor and speed reducing gearing associated therewith;

Figs. 13 and 14 are plan views of switches shown diagrammatically in Fig. 11 and cam means associated therewith for operating the same in accordance with the speed of the timing motor, the views showing the cam and switches in different stages of operation;

Figs. 15 and 16 are plan views of switches, also shown diagrammatically in Fig. 11, operable cooperably with the switches in Figs. 13 and 14 for controlling the energization of the driving motor control circuit, the switches being shown in different operating positions in the two figures;

Fig. 17 is a diagrammatic view of a manually controlled circuit portion substitutable for the cam-controlled circuit portions in Fig. 11, to render the apparatus periodically operable according to manual initiation instead of automatically operable at predetermined intervals.

PRELIMINARY PERSPECTIVE

A general knowledge of the machine and its operation may be gained from an examination of Figs. 1, 2 and 4. In these figures the machine can be seen to comprise a housing H having slide holder drums D disposed on opposite sides thereof and in coaxial relation. The drums D are rotatable and carry about their peripheries a plurality of slides S which are slidable axially from the drums into a projecting section PS of the housing H. A feed or slide picker device PD is reciprocated back and forth between the lower portions of the drums D between transfer stations TS for alternately coupling with and transferring slides, one at a time, from the drums into the projecting section PS of the machine. As a slide is transferred from one of the stations TS into the projecting section PS, another slide which is then stationed in the projecting section is returned to its respective drum D. During this transfer operation a shutter is placed in registry with the machine projecting section so that the subject on the slides will not be projected onto the viewing screen (not shown) while the slides are being moved. Subsequent to the disposal of the new slide into the projecting section of the machine the shutter will be opened to permit projection of the new slide onto said screen. After the return of a slide to its respective drum, the drum will be rotated sufficiently to bring a succeeding slide into coupling relation with the picker device PD so that upon the succeeding reciprocal movement of the picker device said succeeding slide will be transferred into the projecting section PS concurrently with return of the projected slide back to its respective slide holder drum. Thus each time the picker device moves from one side of the machine to the other a slide that has been projected will be returned to its respective drum and a new slide will be carried into the projecting section.

A driving motor DM supplies the driving force for the slide picker PD, the drum rotating means, the shutter and drum piloting means for holding the drums against rotation until slides withdrawn therefrom are returned, all later to be described in detail. This motor is operated intermittently, having a rest period when the shutter is in open position permitting the projection of a slide subject upon the viewing screen; and a constantly running timing motor TM, Figs. 11 and 12, functions to determine the idle period of the driving motor and hence the period the slide in the projecting section PS is allowed to be projected upon the viewing screen.

FRAME AND HOUSING STRUCTURE

The housing H in addition to enclosing many of the moving parts of the machine also serves as a frame for the mounting thereof and about and within which the movable parts of the machine are assembled. Said housing which may be made of any selected number of parts suitably fabricated together includes a top wall 20, a back wall 21, a front wall 22, side walls 23 and 24 and a bottom wall 25. From opposite sides of the bottom wall 25 there depend supporting legs 26 and 27 which may be integral with their respectively associated side walls 23 and 24 and a part of the bottom wall 25. In the present embodiment the various walls of the housing H are formed of cast metal and any number of reinforcing ribs as shown at 28 and 29 in Fig. 4 may be cast into the wall structure at strategic points. Threaded holes 30 and 31 are formed coaxially in the housing legs 26 and 27 for the reception of supporting means (not shown) upon which the housing may be pivotally adjusted for throwing the projector beam in the desired location with respect to a viewing screen.

DRIVE MOTOR AND PRIMARY DRIVE SHAFTING

Driving force for the various moving parts of the machine is derived from the driving motor DM which is suitably mounted in the front lower part of the housing H. The drive shaft 32 of this motor has its back end journalled in a bearing structure generally designated 33 carried in the back wall 21 of said housing. A worm pinion 34 formed integrally with the drive shaft 32 meshes with and drives a worm gear 35 mounted non-rotatively upon a cross shaft 36 which is plainly shown in Figs. 5 and 6 to be journalled in bearings 37 and 38 at opposite of its ends and respectively supported upon the housing side walls 24 and 23. A worm pinion 39 on an intermediate section of the shaft 36 meshes with and drives a worm gear 40 which is secured non-rotatively to a vertical cam shaft 41 which is journalled in bearing sleeves 42 and 43 which are mounted centrally within the housing H within cross members 44 and 45 thereof which are cast integrally with the housing side walls 23 and 24. Various cams for coordinately driving different parts of the machine are carried upon the cam shaft 41 for rotation therewith and these cams will be described hereinafter as an adjunct of the driving means for said various parts of the machine.

THE SLIDE CARRIER DRUMS

The slide holder drums D are rotatively carried at their hubs 46 upon respective spindles 47 which are anchored at their inner ends respectively in the housing side walls 23 and 24. Each of the spindles 47 has a locking device 48 at its outer end for releasably holding its drum D from slipping off the outer end. Each locking device consists of a latch member 49 reciprocally disposed within a spring chamber 50 directed diametrically of its associated spindle 47 and a helical spring 51 also within such chamber for urging the latch member outwardly. A lever 52 pivoted upon a pin 53 extending across a slot 54 extending axially of the spindle 47 communicatively with the associated spring chamber 50, has a finger actuating outer end portion 55 and an inner end projection 56 of which the latter is adapted to force the latch member 49 inwardly against the force of the spring 51 when the outer end portion 55 is engaged by the finger tip of an operator for pivoting such lever clockwise as viewed in Fig. 4. When this is done the latch member 49 will be cleared by the associated hub 46 to permit withdrawal of the drum D from the spindle. When a drum D is mounted upon a spindle 47 there is no necessity for manipulating the lever 55 since the inner end of the drum hub 46 will coact with a camming surface 57 upon the latch for pressing the latter inwardly and thus allowing the drum to be slid onto the spindle 47. After the drum has been slid home the spring 51 will project the latch member outwardly into the position shown in Fig. 4 for holding the drum in place.

The drums D are identical. Each has a cylindrical part 58 spaced radially from its hub 46 by a disk portion 59 that is reinforced by a plurality of webs 60. A second cylindrical portion is in the form of a cylindrical flange 61 arranged concentrically with the cylindrical portion 58 and connected therewith through an annulus 62. A plurality of axial undercut T-slots 63 are formed in the outer periphery of the cylindrical part 58 and a like number of axial slots 64 are formed upon the inner periphery of the cylindrical flange 61. The slots 64 are respectively paired with the slots 63 and are in respective radial alignment with those slots 63 with which they are paired. Each pair of slots 63 and 64 is adapted to hold a slide S in a manner that such slide can be slid axially inwardly with respect to the drum and completely free thereof for placement in the projecting section of the machine.

In addition to the slots 63 and 64 upon the drums D there is a third series of slots or notches 65 formed in the outer periphery of a flange 66 arranged coaxially with the drums and projecting inwardly from their disk portions 59. These notches 65 are equal in number to the grooves 63 and to the grooves 64 and are equally spaced circumferentially of their respective flange.

66 so as to correspond respectively to the pairs of slots 63 and 64. These notches 65 serve as part of piloting or indexing means for holding the drums against rotation during the period that a slide S is transferred therefrom into the projecting section of the machine, and until such time as the slide has been returned and the period arrives for rotatively advancing a succeeding slide to the transfer station TS. A pin PR is adapted to thus engage in one of the notches 65 in the right-hand drum D, Fig. 4, while a pin PL is adatped to thus engage with one of the notches 65 in the left-hand drum D in a manner fully described in the next section of this specification.

The terms "slide" or "slides" as employed in the specification denote a graphic film such as a picture bearing photographic sheet or the like F together with a frame or holder 67 with which it is assembled. Normally the film will be sandwiched between glass plates GL, Fig. 1, 2 and 10, to reinforce the same and insure its uniform disposal in the focal plane of the projector. One of the frames 67 is shown in detail in Fig. 10. Preferably such frames are made from a single piece of sheet metal and comprise two similar counterparts 68 connected by an integral intermediate portion 69 extending along their outer edges and having registering quadrilateral openings 70. A space is provided between the counterparts 68 so that the graphic-bearing sheet F and transparent plates GL may be slid to and from an assembled position therebetween. Cutway sections 72, of which one appears in Fig. 10, may be provided in each of the counterparts 68 along an edge thereof to facilitate grasping of the finger tabs 71.

The inner edge of each slide S is formed substantially T-shaped in cross section, the two inner edges of the counterparts 68 being bent so that longitudinal edge portions 73 thereof are disposed in contiguous relation to jointly form the stem of said T-shaped section and are further bent to form opposed channel sections 74 which jointly form the crossbar of said T-shaped section. Tangs 73a on one of the edge portions 73 project through holes 73b in the other and are bent over to hold the frame assembled. These channel portions 74 are adapted to receive a coupling bar 75 having a latch tongue 76 turned substantially at right angles to the bar at one end as shown in Fig. 10. The opposite end of each bar 75 has a head 75a together with shoulders 75b which are in abutment with their associated ends of channel portions 74 to prevent axial withdrawal of the bars by pulling force applied to the tongues 76.

These tongues 76 are adapted to be coupled onto by the picker device PD to facilitate withdrawal and return of the slides from and to their respective drum holders as will presently be described.

Disk-shaped side plates SP, Figs. 4, 5 and 6, are secured to the outer sides of the housing walls 23 and 24 coaxially with the drums D, and these plates are of sufficient diameter that outer edge portions are opposite the slide tongues 76 to prevent accidental inward displacement of the slides. Notches N in the lower edges of the side plates SP permit withdrawal of the slides at the transfer stations TS.

THE DRIVE FOR CARRIER DRUMS

The slide holder drums which are freely rotatable upon their spindles 41 are rotatively advanced step by step to successively bring the slides S into registry with the transfer stations TS. Such advance of the drums is effected alternately inasmuch as slides are alternately withdrawn therefrom.

Driving force for advancing the slide carrier drums is derived through the vertical cam shaft 41 from which it is transmitted through a sector-shaped cam 80, a cam follower 81, which is driven by the cam 80, and pins 82 and 83 secured on the cam follower in oppositely extending coaxial relation and which are adapted to be alternately inserted in the notches 65 of the drums D and moved circumferentially with respect to the drum axes for rotatively advancing the drums the desired amount. Said pins 82 and 83 serve as journals for bearings 84 and 85 at the upper ends of support links 86 and 87. The lower ends of said links 86 and 87 are provided with bearings 88 and 89 which are journalled on stub shafts 90 of which opposite end portions 91 and 92 are respectively anchored in and coaxial with the drum spindles 47. In Figs. 5 and 6 the cam follower 81 will be seen to embody a quadrilateral configuration having a right camming face 93 (with reference to an observer standing at the front of the machine), a left camming face 94, a front camming face 95 and a rear camming face 96. The generally sector shaped cam 80 has an arcuate camming surface 97 of long radius and an opposite arcuate cam surface 98 of short radius. Cam rise surfaces 99 and 100 are between opposite ends of the arcuate surfaces 97 and 98. Cam points 101 and 102 exist at the intersection of the long radius cam portion 97 and the rise portions 99 and 100. The distance between the opposed cam surfaces 93 and 94 is equal to that between the opposite cam surfaces 95 and 96; and the distance between any point on the short radius portion 98 of the cam 80 and the diametrically opposite point on the long radius cam portion 97 is also equal to distances between said opposed cam faces as 93 and 94 on the yoke-like follower. And the contour of the cam rise portions 99 and 100 is such that four peripheral parts of the cam will respectively and simultaneously contact some part of the cam follower faces 93, 94, 95 and 96, thus holding the cam follower against radial play with respect to the cam.

During rotation of the cam shaft 41 and of the cam 80 clockwise as indicated by the arrows in Figs. 5 and 6 the cam rise 100 will successively pass in registry with the cam follower faces 94, 95, 93 and 96. With reference to Fig. 5, rotation of the cam 80 will first carry the face 100 along the cam follower face 94 for shifting the cam follower toward the left side of the machine (as viewed from the front) incident to sliding the bearings 88 and 89 on the lower ends of the links 86 and 87 along the stub shafts 90 and incident to withdrawing the pin 83 from its drum notch 65 and inserting the pin 82 into the drum notch 65 in axial registry therewith. It will be seen that the pins 82 and 83 are projectable outwardly through openings 103 and 104 in the housing side walls and openings 103a and 104a in the wall plates SP. Continued rotation of the cam 80 will carry the cam rise 100 along the cam follower face 95 for displacing the cam follower rearwardly incident to pivoting the supporting links 86 and 87 upon the stub shafts 90 and also pivoting the bearings 84 and 85 at the upper ends of said links upon the pins 82 and 83 while displacing the pins 82 and 83 rearwardly. Since the pin 83 is disengaged from any of the notches 65 in the right-hand drum D, said drum will not be disturbed, but since the pin 82 is then engaged with one of the notches 65 in the left-hand drum D, this latter drum will be rotatively advanced by one position to advance a slide S into registry with its associated transfer station TS. Further rotation of the cam 80 carries the cam rise 100 along the cam follower face 93, displacing the cam follower toward the right side of the machine (as viewed from the front) incident to sliding the bearings 88 and 89 in this same direction, along the stub shafts 90 and incident to withdrawing the pin 82 from its notch 65 and placing the pin 83 in one of the notches 65 in registry therewith. During the final quarter movement of a complete revolution of the cam 80 the cam rise 100 will pass along the cam follower face 96, carrying the pins 82 and 83 forwardly of the machine, the pin 82 then having no effect since it is engaged with no notch 65 while the pin 83 causes rotative advancement of the right-hand drum D by one position to advance a slide S into registry with its associated transfer station TS. It will be noted that the pin 82 causes rotation of the left-hand drum D while moving rearwardly of the machine whereas the pin 83 causes rotation of the right-hand drum D while moving forwardly of the machine, and since the pins 82 and 83 are both above the rotational axes of these drums, they are rotatively advanced in opposite directions.

Pursuant to each revolution of the cam 80, starting from the position shown in Fig. 5, the pin 82 will be inserted in a notch 65 of its associated drum, moved backwardly with respect to the machine to cause rotative advancement of the drum, then the pin 82 will be withdrawn from its notch while the pin 83 is moved into a notch 65 of its associated drum and subsequently the pin 83 is moved forwardly with respect to the machine causing rotative advance of the right-hand drum D. Thus one of the drums is first rotated in one direction and subsequently the other drum is rotated in the other direction pursuant to each complete rotation of the cam 80.

It will be understood that each time one of the drums D is advanced a rotative step by its associated pin as 83 such pin is withdrawn from its notch 65, and, as explained hereinabove the pilot or holding pins PR and PL are then projected into respective of the notches 65 for holding the drums against rotation until such time as the slides are returned thereto and it is desired to advance the drums another step. These pilot pins PL and PR are upon opposite ends of a rod 105 supported for axial reciprocation in bearings 106 and 107 in the housing side walls 23 and 24 near the front wall 21. The holes in these bearings 106 and 107 extend entirely through their walls so the pins PL and PR upon the ends of said rod are projectable outwardly through the walls. For instance, it will be seen in Fig. 5 that the pin PL is projected outwardly of the wall 23 through the opening in the bearing 106 whereas in Fig. 6 the pin PR will be seen projected outwardly of the housing through the opening in the bearing 107. Reciprocating means for the rod 105 consists of a lever 108 pivoted upon the shank of a headed fulcrum member 109 anchored upon a bracket 110 projecting inwardly from the housing side wall 24. The back end of the lever 108 fits within a circumferential groove 111 in the rod 105 whereas the opposite end of this lever has bifurcations 112 and 113 which are upon opposite sides of a boss 114 of the bearing 89 at the lower end of the supporting link 87 for the cam follower 81. In Fig. 5 it will be seen that upon movement of the yoke like follower 81 toward the left side wall 23 of the housing incident to removing the pin 83 from its notch 65, and the movement of the bearing 89 and the boss 114 upon such bearing 89 with said follower, that said boss will cause the lever 108 to pivot clockwise for carrying its back end toward the right wall 24 of the housing and thus projecting the pilot pin PR into one of the notches 65 and thus holding the right drum D in the position to which it had been advanced by the pin 83. When the cam follower 81 completes its movement toward the left housing wall 23, further rotation of the cam 80 will cause the pin 82 to be moved rearwardly in its slot 103 for advancing the left drum D one step whereupon the parts will occupy the position illustrated in Fig. 6. Upon further rotation of the cam 80 whereby the cam follower 81 is moved toward the housing wall 24 incident to withdrawing the pin 82 from its notch 65 the lever 108 will be pivoted counter-clockwise, causing the rod 105 to be shifted toward the housing left wall 23 and the pilot pin PL upon said rod 105 to be projected into one of the notches 65 on the left drum D for holding it in the desired position at which it has been rotated by the pin 82. Said lever 108, since it is on a pivot point between the rod 105 and the common axes of the pins 82 and 83, causes said rod and said pins 82 and 83 to occupy opposite positions laterally of the housing H, that is, when the pin 83 is projected outwardly of the housing wall 24 for being moved forwardly in the opening 104 and thus causing rotative advancement of the right-hand drum D, the pin PR will be retracted into the housing wall 24 and out of association with any of the notches 65 so the drum is free to rotate under the force imparted thereto by the pin 83. Concurrently the pin 82 will be retracted into the housing wall 23 and the pin PL will be projected outwardly of the housing into one of the notches 65 in the left-hand drum for holding it against rotation. When the conditions are reversed wherefore the pin 82 is projected outwardly of the housing wall 23 for disposal in one of the notches 65 of the left-hand drum and imparting rotation to this drum, the pin PL will be retracted into the housing wall 23 to permit this function of the pin 82.

THE SLIDE PICKER MECHANISM

The slide projecting section PS includes a frame like structure wherein there is a generally rectangular web 115 partially filling the area embraced between the housing bottom wall 25 and the supporting legs 26 and 27, said web 115 in this instance being cast integrally with the housing wall 25 and said legs 26 and 27. A rectangular opening 116 is formed in the web 115 and there is attached to the back face of said web a metal plate 117 which has a rectangular opening 118 of substantially the same size as the opening 116 and in axial registry therewith. Screws 119 secure the plate 117 to the web 115. Said web 115 and the plate 117 are so shaped as to provide a channel 120 therebetween which is open at its opposite ends at the transfer stations TS to provide for the insertion and withdrawal of the sides S. The lower edges 69 of the slides are adapted to rest and slide along the bottom of the channel 120 and the opposite edges of the head formed by the channel portions 74 register with and are adapted to slide in opposed grooves 121 respectively in the web 115 and the plate 117.

Detent studs 122 and 123 are respectively carried upon leaf spring members 123x and 124 respectively at the top and bottom of the opening 116 in the web 115 and are pressed inwardly through holes 125 and 126 in the said web and by said springs for engagement in indentations or holes 127 and 128 in the counterpart 68 of the slide disposed theretoward when the slide is disposed in registry with the projecting section. The springs 123x and 124, which may be of any desired shape, are in this instance attached to the web 115 by machine screws 129 and 130; see Figs. 1, 2 and 4.

The picker mechanism is for moving the slides into the space therefor between the web 115 and the plate 117 and comprises a crosshead 131 which is reciprocal from right to left and from left to right between the upper portions of said web and said plate; Figs. 4, 8 and 9.

The crosshead 131 is made of pressed metal. It has a beaded section 132 for riding within a horizontal groove 133 in the plate 117. A latch bar 134, Figs. 8 and 9, depends from the crosshead 131. This bar is generally U-shaped, it having latch heads 135 and 136 at opposite of its ends and inwardly turned lugs 137 and 138 which slidingly engage arcuate edge portions 139 and 140 at opposite ends of the crosshead. A loop spring 141 has its loop portion disposed within a notch 142 in the lower edge of the crosshead, said spring having end hooks 143 and 144 engaged with the lower edge of the crosshead at opposite sides of the notch 142 for reacting upwardly against such lower edge while the lower part of the loop portion of the spring reacts downwardly against a seat portion 145 of the latch bar to normally maintain the latch bar in a lower position which is established by lugs 139x and 140x on the crosshead and disposed respectively at the lower termini of the arcuate edge portions 139 and 140 and downwardly upon which the lugs 137 and 138 are respectively engageable. Coupling notches 146 and 147 are formed in the lower edges of the latch heads 135 and 136 and inclined striking edges 148 and 149 are also formed upon said latch heads.

The bead 132 riding in the groove 133 of the plate 117 prevents vertical displacement of the crosshead. However, the latch bar 134, while normally held in a lower position by the spring 141 with the lugs 137 and 138 at the lower ends of the arcuate edges 139 and 140 and downwardly engaged on the lugs 139x and 140x, as shown in Fig. 9, is displaceable vertically bodily against the downward force of the spring 141 or is differentially displaceable, that is, either the latch head 135 or the latch head 136 may be raised independently of the other. In Fig. 8 the latch head 136 is shown raised while the latch head 135 remains in its lowermost position.

The inclined striking edges 148 and 149 on the latch heads 135 and 136 coact with the spring 141 for facilitating assembly of the slide-loaded drums D with the machine. For instance, should a drum be slid onto its spindle 47 in such rotative relation with respect thereto as to project one of the latch tongues 76 against the associated latch head as 136, said tongue would strike the inclined edge 149 and thereby cam said latch head upwardly, the spring 141 then forcing said head as 136 downwardly when the tongue 76 arrived in registry with the notch as 147. When either of the latch heads 135 or 136 is associated with the latch tongue 76 of a slide in its drum D, as illustrated in Fig. 9, the notch as 147 in such latch head provides adequate clearance that such latch tongue may be moved out of coupling relation with the latch head and that a succeeding latch tongue as 76 may be moved into coupling relation therewith pursuant to rotative advance of the drum D, and without disturbing the position of the latch bar 134.

Driving force for the picker mechanism is received from the driving motor DM through the main cam shaft 41 and a cam 150 fixed nonrotatively thereto; see Figs. 1, 2 and 7. Said cam 150 has a short radius profile 151 and a diametrically opposite long radius profile 152 between the ends of which there are intermediate rise profiles 153 and 154. Points 155 and 156 occur at the intersection of the rise profile sections 153 and 154 with the long radius profile section 152. A cam follower 157 in the shape of a yoke made from pressed metal has an opening 158 surrounding the cam 150. This cam follower has upwardly turned flanges 159 and 160 at opposite edges of the opening 158 and which simultaneously bear in slidable engagement with opposite peripheral portions of the cam 150. The back end of the cam follower is pivotally connected with a headed pivot post 163 screw threaded into a boss 161 formed integrally with a front part of the housing lower wall 25. The other end of the cam follower 157 is pivotally connected with an intermediate portion of a pressed metal lever 162 by means of an unthreaded reduced diameter portion of a bolt 164 of which a threaded shank portion is passed through the cam follower and secured firmly thereto by a nut 165 turned tightly against the under face of the cam follower. The front end of the lever 162 is pivotally connected with a pivot pin 166 which is anchored in the bottom wall of the housing and which projects into an elongated opening 167 of the lever. At the back end of said lever 162 there is a rectangular opening 168 through which spring extensions 169 and 170 extend upwardly in opposed relation, said extensions being biased for gripping a section of a pin 171 which is connected with the crosshead 131. The extensions 169 and 170 are integral with a flat metal piece 171a riveted or otherwise connected to the under side of the lever 162.

Inasmuch as the cam 150 is connected for rotation with the cam shaft 41, said cam will be caused to rotate clockwise as viewed in Fig. 7 with clockwise rotation of the cam 80 as viewed in Figs. 5 and 6. One position of rest of the cam 150 and corresponding positions of rest of the cam follower 157 and of the lever 162 are shown in full lines in Fig. 7 whereas the other positions of rest of said cam follower and said lever are shown in dotted lines. Since the cam 150 acts upon the opposed faces of the cam follower flanges 159 and 160 at points between the fixed pivot 163 and the swinging pivot 164, and since the latter pivot is associated with the lever 162 between the pivot 166 and the connecting pin 171 to be moved by said lever 162, there is an amplification of the movement of the pin 171 with respect to the eccentricity or throw of the cam 150. The elongated openings 167 and 168 in the lever 162 permit endwise adjustment of the lever to accommodate for the rectilinear movement of the pin 171 and for the arcuate movement of the cam follower 157. It is to be understood, of course, that when the pin 171 is at the right side of the machine as shown in full lines in Fig. 7 the picker device PD will also be at the right side of the machine since the pin 171 is drivingly connected with the crosshead 131 of said picker device, and, it follows that when the pin 171 is at the left-hand side of the machine said picker device will also be at the left-hand side.

THE SHUTTER AND DRIVE THEREFOR

A shutter mechanism for the machine comprises a vertical reciprocal plate 172 which is disposed in axial registry with the projecting section PS of the machine during slide movement and which is disposed in an upward position at the upper limit of its reciprocal movement, as shown in Fig. 1, when slides are at rest in the projection section. Prior to operation of the slide picker mechanism for shifting a slide to or from the projecting section the shutter plate 172 will be dropped into the position shown in Fig. 2 where it will remain until the new slide has come to rest in the position to be projected.

A guide slot for the slide plate 172 is provided by a pressed steel plate 173 which is secured in spaced relation with and to the main portion of the front face of the plate 117 by the aforesaid screws 119 and an additional screw 175. There is an opening 174 in the plate 173 in registry with the web opening 116 to permit the projection of a light beam through the projecting section PS.

Other guide means for the shutter plate 172 consists of vertical ribs 176 and 177 formed integrally with the housing side walls 24 and 23 and which have vertical grooves 178 and 179 which slidably receive plate extensions 180 and 181 which project upwardly from the opposite vertical edges of the shutter plate. Said vertical extensions 180 and 181 are provided with forwardly directed vertical flanges 182 and 183 in which there are pins 184 and 185 that project into elongated openings 186 in ears 187 turned generally upwardly from the legs 188 of a flat U-shaped lever plate 189; see Figs. 1 and 2.

The lever plate 189 is fixed for oscillative movement with a segmental gear 190 which is fixed upon a cross shaft 191 having its two ends journalled at 192 and 193 in housing side wall bosses 194 and 195 shown in dotted outline in Fig. 4. A second cross shaft 196, arranged parallel with and generally above the shaft 191, has its end sections journalled at 197 and 198 in housing side wall bosses 199 and 200. A second segmental gear, 201, is fixed upon the cross shaft 196 and meshes with the segmental gear 190. A cam follower portion 202 on the hub of the gear 201 has a notch 203 which receives a peripheral portion of a laterally profiled cam plate 204 which is shown in perspective in Fig. 3. This cam 204 is for oscillating the gears 201 and 190 and the lever plate 189 which is affixed to the gear 190, causing the lever plate 189 to oscillate between the positions shown in Figs. 1 and 2. Because of the connection of the apertured ears 187 of the lever plate 189 with the pins 184 and 185 connected with the upward extensions at the side edges of the shutter plate 172, this oscillative movement of the lever plate 189 causes vertical reciprocation of the shutter plate.

When either of the downwardly displaced profile sections 205 or 206 is disposed within the groove 203 of the cam follower portion 202 the segmental gear 201 will be rotated to the clockwise limit of its oscillative movement shown in Fig. 1, causing the shutter plate 172 to be elevated from registry with the plate openings 174 and 118 and the web opening 116 in the projecting section of the machine, and when either of the diametrically opposite peripheral portions 207 or 208 is disposed within the cam follower groove 203 the gear 201 will be rotated to the oscillative limit shown in Fig. 2 wherefore the lever plate ears 187 will be at their downward limit as will the shutter plate 172 for cutting off the projection of the light beam through the plate openings 174 and 118 and the web opening 116.

ELECTRIC DRIVE AND CONTROL CIRCUITS

Reference should now be had to Fig. 11 where an automatic electric circuit for controlling and supplying electric energy to the driving motor DM is shown diagrammatically. Both the timing motor TM and the driving motor DM are assumed, for the purpose of illustration, to be of the commutator type, that is, of the type in which electric energy is supplied to the armature winding through brushes which for the timing motor are designated 209 and 210 and which for the driving motor are designated 211 and 212. Separate field windings for the timing motor are designated 213 and 214 whereas separate field windings for the driving motor are designated 215 and 216 and of which the latter is energizable to cause reverse rotation of the driving motor. Electric energy for the circuit may be obtained from a commercial supply through an outlet plug 217 from which a conductor 218 of one polarity leads to the movable contacts 219 and 220 of switches 221 and 222 which are operated under control of the driving motor. A cam 223 for manipulating the switches 221 and 222 is connected non-rotatively with the upper end of the vertical cam shaft 41; see Figs. 1, 2, 15 and 16. An insulator block 224 upon which the switches 221 and 222 are mounted is secured in any suitable manner to the housing so as to dispose the switch contacts on opposite peripheral sides of the cam 223. In Figs. 11 and 16 the cam 223 is shown with a notch or short radius profile portion 225 in registry with a rider 225a on the contact spring member 220 which is of the leaf spring type and biased toward the switch-opening position, thus permitting the switch 222 to open. The long radius profile portion 226 of said cam 223 is in registry with a rider 227 on the switch contact member 219 which is also of the leaf spring type and to maintain this contact in the switch-closing position. Consequently the contact 220 and its mate 228 are open while the contact 219 and its mate 229 are closed. Should the cam 223 be rotated 180° the condition of the switches 221 and 222 would be reversed, the switch 222 then being closed and the switch 221 open. Such reverse condition is shown in Fig. 15.

The timing motor TM which is a constantly driven motor is mounted in the machine housing in some such manner as shown in Fig. 1. This motor, Fig. 12, has upon its armature shaft 230 a worm pinion 231 which is effective through a speed reduction gear train comprising a worm gear 232, a worm pinion 233 rotatable on a common shaft 234 with the gear 232, and a worm gear 235 meshed with the pinion 233 for driving a driven shaft 236 and a cam 237 fixed to its upper end. Said shaft 236 and the cam 237 are also shown in Figs. 11, 13 and 14. Figs. 11, 13 and 14 illustrate the association of timing switches 238 and 239 in association with the cam 237 for operation thereby. Said switches 238 and 239 which are of the leaf spring variety are supported upon an insulating block 240 which is mounted in any suitable manner as upon the timing motor casing to dispose the contacts of these switches upon opposite peripheral sides of the cam 237. The switch 239 has contacts 241 and 242 of which the former is biased toward the switch-opening position whereby a rider 243 thereon constantly bears against the periphery of the cam. Switch 238 comprises contacts 244 and 245 of which the latter is biased toward switch-opening position and carries a rider 246 which constantly bears against the periphery of the cam 237.

Said cam 237 has a long radius peripheral portion 247 upon a cam lobe 248 and when this lobe is in registry with either of the riders 243 or 246 the switch with which such rider is associated will be closed, and when the short peripheral portion 249 of the cam is in registry with either of the riders their associated switch or switches will be open.

Referring once more to Fig. 11, attention is directed to a terminal block 250 having thereon a plurality of terminals respectively numbered 251 to 253 and 255 to 258 to facilitate connection of the motor windings in different desired hookups and to adapt the apparatus for the substitution of a manually controlled control circuit of which conductors pass through a cable CA in Fig. 17 for connection with the terminal block in lieu of the timing motor controlled control circuit which is established by bridging conductors 260 and 272 for the terminals 252 and 253 and for the terminals 251 and 255. In practice the bridging conductors 260 and 272 are connected between the prongs of a multi-prong plug (not shown), which prongs correspond respectively to and are insertable into physical assembly and electrical contact with their corresponding terminals of the block 250 when the plug is attached. Removal of the plug removes the bridging conductors 260 and 272 to disable the timing motor portion of the control circuit. Also, in practice, the cable CA of the manual control circuit has a multi-prong plug (not shown) upon its right end, Fig. 17, and the prongs of such plug, which are connected with respective conductors in their associated cable, are insertable into the terminals of the block 250 with which the conductors are to be electrically connected. However, the entire circuit in Fig. 11, together with its operation, will be described before describing the circuit in Fig. 17.

In the automatic setup, Fig. 11, the line 218 of one polarity is connected with the block terminal 255 through a conductor 259, and this terminal is connected with the terminal 251 through the removable plug conductor 260. The timing motor is connected in series, that is, with its field windings in series with the armature wherefore the circuit from said terminal 251 is continued through a conductor 261 through the timing motor winding 214, thence through the other winding 213, a conductor 262, brush 210, the armature coil (not shown) connected with said brush, brush 209, a conductor 263, the movable contact arm 264 of a variable resistance unit 265, conductor 266, a portion of a conductor 267, a main switch 268 which will be closed when the machine is started, and a conductor 269 back to the opposite polarity of the electrical energy source. Speed control of the timing motor is effected by adjusting the contact arm 264 along the resistance unit 265 of which the right end is connected through a fixed resistance unit 270a with a junction 271a of conductor portions connected respectively with the right end of the field winding 213 and with the armature brush 210. Inasmuch as the energization circuit for the timing motor TM remains established by conductor 260 connected between the terminals 251 and 255, the speed of this motor is regulatable by adjusting the switch arm 264 for varying the amount of the resistance unit 265 that is in series with the armature of the motor. By throwing the switch arm 264 clockwise to increase the amount of resistance in series with the armature the motor speed is decreased.

Electric energy for the driving motor DM is obtained through the conductor 267 which leads to the armature brush 211, the circuit being continued through the armature to the brush 212 and thence through either of the field windings 215 and 216 to the terminal block. Winding 215 is connected with the terminal 253 through a conductor 270 while the winding 216 is connected to the terminal 258 through a conductor 271. A resistance R is shunted across the motor armature to reduce its speed. Voltage of opposite polarity to that carried to the terminal 253 through the motor armature and winding 215 is applied to the terminal 252 at certain times, presently to be described, through the switches 221, 222, 238 and 239. Therefore, the plug conductor 272 is used for connecting the terminal 253 with the terminal 252. The reverse field winding 216 is not energizable under control of the timing motor TM. As explained above electric energy of one polarity is obtained from the source through the conductor 218 and applied thereby upon each of the contacts 219 and 220 in the drive motor switches 221 and 222. Contacts 228 and 229 of these switches 221 and 222 are respectively connected with contacts 242 and 244 of the timing motor switches 239 and 238 by means of conductors 275 and 276, and the contacts 241 and 245 of said switches 239 and 238 are connected through a common conductor 277 with the terminal 252 on the terminal block 250.

In Fig. 11 the timing motor switches 238 and 239 and the driving motor switches 221 and 222 are illustrated in such condition that causes the driving motor DM to be at rest. This condition was brought about by the driving motor cam 223 bringing the short radius profile 225 thereof in registry with the switch 222 and thus permitting the contact 220 to separate from the contact 228. Prior to the separation of the contacts 220 and 228 the driving motor was energized through a circuit including the conductor 267, the motor armature, the field coil 215, conductor 270 which is connected by the conductor 272 with the terminal 252, conductor 277, contact pair 241—242 of the timing motor switch 239, conductor 275, said contact pair 220—228, and the conductor 218 back to the energy source. The driving motor cam 223, it will be recalled, is on the upper end of the vertical cam shaft 41 of the machine, Figs. 1, 2 and 4, and the short radius peripheral portion 225 of said cam is so arranged circumferentially of the cam shaft 41 with respect to the cam 150, Fig. 7, and the shutter actuating cam 204, Figs. 1, 2 and 3, that the quiescent period of the drive motor incurred by said opening of the switch 222 occurs when said cam 180 has actuated its associated cam follower 157 for stationing a new slide S in the projecting section of the machine and when said cam 204 has raised the shutter plate 172 to permit the projection of a projecting light beam through said projecting section. Thus while the driving motor is at rest the machine is otherwise conditioned for projecting the subject of a slide stationed in the machine projecting section. During this quiescent period of the driving motor DM the timing motor TM will be rotating the timing motor cam 237, say clockwise as indicated by the arrow in Fig. 11, whereby the long radius profile 247 will eventually come in registry with the switch 238 for closing the contacts 244 and 245. The driving motor switch 221 is then being held closed by the long radius profile 226 of its associated cam. The speed of the timing motor is so regulated by the contact arm 264 and the resistance unit 265 that the long radius profile 247 closes the switch 238 after the slide has been projected a predetermined length of time, and upon such closing of the switch 238 the driving motor DM will be energized for causing the machine to perform the operation of returning the projected slide to its carrier drum D and bringing a new slide from the other drum into position for projection. This energization of the driving motor is effected by completion of a circuit including the conductor 267, the armature and field winding 215 of said motor, the conductor 270, the connected terminals 253 and 252, conductor 271, timing motor switch 238, conductor 276, driving motor switch 221, and the conductor 218 back to the energy source. After the new slide is in the projecting section of the machine and the machine is otherwise conditioned for the projection of such slide, the driving motor will have driven the driving motor cam 223 through 180° for bringing the short radius profile 225 into registry with the switch 221, permitting this switch to open and break the just described energization circuit for said motor and conditioning the same to again become quiescent during a succeeding slide projecting period. As long as the plug 217 is connected with the energy source and the main switch 268 is closed the apparatus diagrammatically shown in Fig. 11 will continue to operate as aforesaid, the timing motor cam 237 operating continuously to periodically and alternately close the timing motor switches 238 and 239 to establish an energization circuit for the driving motor DM through one of the driving motor switches 221 or 222, causing the driving motor to commence operation and operate sufficiently long to take the old slide from the machine projecting section and deposit a new slide therein and to then bring the short radius profile 225 into registry with the switch 221 or 222, which had been in series with the driving motor energization circuit, for opening said circuit and causing the motor to come to rest for a time determined by the speed with which the timing motor drives the timing motor cam 237.

OPERATION OF THE MACHINE

Timing motor control

In describing a complete cycle of the operation of the machine the starting point or condition of the machine will be assumed as that in which the parts are in the relative positions illustrated in Figs. 1, 4, 5, 7, 9, 11, 14 and 16. Upon examining Figs. 11, 14 and 16 the motor driven switch 222 will be seen in the opened condition to have opened the driving motor energization circuit that includes the timing motor switch 239 which still remains closed. Consequently all parts of the machine with the exception of the timing motor TM and the gear train associated therewith for driving the timing cam 237 are at rest. A slide S is in the projecting section of the machine and is being projected upon a viewing screen or the like. The vertical cam shaft 41 which is at rest is in such position of rotation that the shutter actuating cam 204 has the downwardly disposed peripheral profile 205 within the cam follower section 202 of the segmental gear 201, wherefore the mated segmental gear 191 and the plate lever 189 are rotated to their counter-clockwise position for maintaining the shutter plate 172 in its elevated position.

The cam 80 as viewed in Fig. 5 is in the position for holding the cam follower 81 toward the right side of the machine with the drum advancing pin 83 in one of the notches 65 of its associated slide holding drum. The point 102 of said cam 80 is in registry with the cam follower face 96 whereby the follower 81 is also at its foremost position so that the drum advancing pin 83 will have been moved forwardly in the side wall slot 104 and consequently the right-hand drum D will have been advanced for bringing a new slide S into coupling relation with the coupling head 136 on the picker mechanism as shown in Figs. 4 and 9. Since the cam follower 81 and hence the bearing 89 at the lower end of the link 87 associated with said cam follower are disposed toward the right side of the machine, the rib 114 on the bearing member 89 will be in position to hold the lever 108 in its counter-clockwise position whereby the pilot stem rod 105 will be shifted toward the left side of the machine with the pin PL thereon in one of the notches 65 of the left-hand drum D for holding this drum against accidental rotation so that upon subsequent operation of the machine the slide S in the projecting section will be returned into the drum groove 63 of said left-hand drum D from which it had been previously transferred.

Further down on the cam shaft 41 and as shown in Fig. 7 the cam 150 is in the full line position whereby the cam follower 157 and the lever 162 operated under control of said cam 150 are also in the full line position for maintaining the slide picker mechanism at the right side of the machine as shown in Figs. 4 and 9.

After the slide at the projecting section of the machine has been projected for a predetermined time which is regulatable by changing the speed of the timing motor TM by regulating the position of the switch arm 264, Fig. 11, along the resistance unit 265, the timing motor cam 237 will bring the long radius profile section 247 into the position for closing the timing motor switch 238. When this occurs a circuit will be established from the electric energy source through the conductor 269, control switch 268, conductor 267, brush 211 of the drive motor, the armature coil connected between said brush and the brush 212, field winding 215, conductor 270, connected terminals 253 and 252, conductor 271, timing motor switch 238, conductor 276, driving motor switch 221, and the conductor 218 back to the other side of the electric supply source. Thus upon the closing of the timing motor switch 238 the driving motor DM will be energized and will drive, through the above described gear train, the vertical cam shaft 41 in the clockwise direction as viewed from above. During this energization of the driving motor the first part of an operating cycle of the machine will be performed quickly. The driving motor will be permitted to run sufficiently long to rotate the vertical cam shaft 41 and the various cams connected therewith through 180°. The first cam to perform its function is the cam 204 positioned near the upper end of the cam shaft 41. During the first part of its 180° rotation the cam follower portion 202 of the segmental gear 201 will be caused to ride upwardly onto the cam periphery 208 thereby causing said gear 201 to rotate counter-clockwise and the mated gear 191 and the plate lever 189 connected therewith to rotate clockwise for displacing the ears 187 on the two legs 188 of the lever plate downwardly. Thus the pins 184 and 185 disposed within the openings 186 of said ears 187 are moved downwardly as well as the upwardly extending parts 180 and 181 of the shutter plate 172, said pins 184 and 185 being anchored in forwardly turned flanges 182 and 183 upon said extensions 180 and 181. Consequently the shutter plate 172 will first be moved downwardly with dispatch.

Early in said 180° of the cam shaft 41 the rise profile 100 of the cam 80, Fig. 5, will begin to act against the cam follower face 94 of the cam follower 81 for throwing said cam follower toward the left side of the machine. Thus the pin 83 is withdrawn from its notch 65 in the right-hand drum D and the pin 82 is projected into a notch 65 of the left-hand drum D. Concurrently the rib 114 on the bearing 89 which moves axially with the pins 82 and 83 acts upon the lever 108 to cause its clockwise rotation and the projection thereby of the rod 105 toward the right side of the machine for projecting the pilot pin PR into one of the notches 65 whereby the right-hand drum D will be held against accidental rotation after withdrawal of the pin 83. This movement of the rod 105 toward the right side of the machine also withdraws the pilot pin PL from its associated notch 65 in the left-hand drum D so that this drum will be free for subsequent rotative advance by the pin 82.

Substantially concurrently with the movement of the pin 83 from the right-hand drum and the pin 82 into association with the left-hand drum the cam 150, Fig. 7, will carry its cam rise periphery 154 against the cam follower flange 160 for pivoting the cam follower 157 clockwise about the pivot post 163 whereby the lever 162 is pivoted counter-clockwise about the pivot pin 166 and to move the pin 171 and the slide picker device PD, of which said pin 171 is a part, toward the left side of the machine. This movement of the slide picker device causes the slide in the machine projecting section to be returned into its slot 63 in the left-hand drum D and effects transfer of the slide with which it is coupled in the right-hand drum D into said machine projecting section. When the point 156 of the cam 150 engages the cam follower flange 160 the slide picker device will have been transferred to the left side of the machine and the slide withdrawn from the right drum D will then be in the machine projecting section. The cam follower 157 and the lever 162 will then be in the dotted line position shown in Fig. 7. It will be noted, however, that rotation of the cam 150 can continue without imparting further movement to the parts 157 and 160 while sliding the long radius profile 152 along the flange 160.

After the slide picker device PD has been moved to the left side of the machine and during said continued rotation of the cam 150 while sliding the long radius profile 152 along the flange 160, pursuant to completion of the 180° rotation of the cam shaft 41, the shutter actuating cam 204 will carry the downwardly displaced profile portion 206 into registry with the cam follower portion 202 of the segmental gear 201 so that said gear, the gear 191, and the lever plate 189 will be rotated for again assuming their respective positions shown in Fig. 1. Consequently the shutter plate 172 will be raised so the projecting beam will be effective for projecting the slide subject onto the viewing screen. Also during the latter portion of the 180° rotation of the cam shaft 41 the rise profile 100 will be carried against the cam follower face 95 for projecting the pin 82 rearwardly whereby the left-hand drum D is advanced one step for carrying the slide just returned thereto out of coupling relation with the coupling head 135 of the slide picker device PD and to bring a succeeding slide into coupling relation with said coupling head. The cam 80 and the pins 83 and 82 will then be in the position illustrated in Fig. 6. Substantially at this time the short radius profile 225 on the motor cam 223 arrives in registry with the motor switch 221 to cause the opening of this switch and the breaking of the motor energization circuit so that the driving motor comes to rest.

After the slide, has been projected for a predetermined time period of selected length the timing motor cam 237 will again carry its long radius profile 241 into registry with the timing motor switch 239, closing this switch and thus completing a driving motor energization circuit previously conditioned by the closing of the motor switch 222 by the long radius profile 226 of the motor driven cam 223 which was disposed in registry with said switch during the just described 180° rotation of the cam shaft 41. This energization circuit for the driving motor includes the conductor 267, the driving motor armature coil (not shown) connected between the brushes 211 and 212, the driving motor field windings 215, conductor 270, the connected terminals 253 and 252, conductor 277, switch 239, conductor 275, switch 222 and the conductor 218 back to the electric supply source. The driving motor thus energized will again be effective for driving the cam shaft 41 through 180° before the energization circuit for this motor is opened by the arrival of the short radius profile 225 in registry with the switch 222.

During the initial part of this second 180° rotation of the cam shaft 41 the downwardly displaced profile portion 206 of the shutter actuating cam 204 will be withdrawn from registry with the cam follower section 202 of the segmental gear 201 and the profile section 207 will be carried into such registration pursuant to which the incline between these two profile sections 206 and 207 will cause the gear 201 to be pivoted counter-clockwise whereby the mated gear 191 and the lever plate 189 will be pivoted clockwise to the position shown in Fig. 2. Consequently the shutter plate 172 will be lowered into closing relation with the various light beam passing holes 116, 118 and 174 in the machine projecting section.

It will be recalled that the cam 180 was left in the position shown in Fig. 6 at the end of the first 180° rotation of the cam shaft 41. In the initial part of the present 180° rotation of said cam shaft the inclined profile 100 of said cam 80 will first be carried slidingly against the cam follower face 93 to cause movement of the cam follower 81 to the right whereby the pin 83 is projected into one of the notches 65 in the right-hand drum D and withdrawing the pin 82 from its associated notch 165 in the left-hand drum D. Concurrently with this movement of the pins 82 and 83 to the right with the cam follower 81, the lever 108 is actuated as aforesaid pursuant to said movement of the cam follower, this actuation of the lever 108 being a counter-clockwise pivotal movement for causing its back end to shift the rod 105 toward the left side of the machine. The pin PR is thus withdrawn from the right-hand drum but the pin 83 is projected into one of the notches 65 of the drum to hold it against accidental rotation and preparatory to imparting rotation to said drum during the final part of this 180° rotation of the cam shaft 41. The pilot pin PL is projected into one of the notches 65 of the left-hand drum to hold it against accidental rotation while the pin 82 is withdrawn from said drum.

After the shutter plate cam 204 has rotated far enough to cause the lowering of the shutter plate 172, the profile rise 154 on the cam 150, Fig. 7, slides and acts upon the cam follower flange 159 for pivoting the cam follower 157 counter-clockwise and for pivoting the lever 162 clockwise so that the parts 157 and 162 begin their movement from their respective dotted line positions shown in Fig. 7 to the full line positions in that figure. When the point 156 on the cam 150 reaches the follower flange 159 the cam follower 157 and the lever 162 will reach the full line positions in Fig. 7. During this clockwise pivotal movement of the lever 162 the slide picker device PD moved thereby will have been effective for returning the projected slide to the right-hand drum D and to have transferred a new slide from the left-hand drum D, that is, the slide that was advanced into coupling relation with the coupling head 135 of said slide picker device, into the machine projecting section.

Immediately upon the arrival of the new slide into the machine projecting section the incline on the shutter control cam 204, between the peripheral profile 207 and the downwardly displaced profile 205, will be carried through the notch 203 in the cam follower portion 202 of the segmental gear 201 for pivoting this gear clockwise as viewed in Fig. 1 and to return said gear, the gear 191, the lever plate 189 and the shutter plate 172 controlled thereby to the positions shown in Fig. 1. With the shutter plate 172 thus raised, the slide just transferred into the projecting section of the machine will have its subject projected onto the viewing screen. As the cam shaft 41 finishes this second 180° rotation the long radius profile on the cam 150 will slide idly along the cam follower flange 159 until finally arriving at the full line position shown in Fig. 7. Also during such final rotation of the cam shaft 41 the rise profile 100 of the cam 80, Fig. 6, will be carried against the cam follower face 96 whereby said cam follower is moved forwardly in the machine as is the pin 83 for advancing the right-hand drum one step whereby the slide S just returned thereto by the movement of the slide picker device PD to the right side of the machine will be moved out of coupling relation with the coupling head 136 and a new slide is moved into coupling relation with said coupling head preparatory to being transferred into the machine upon the starting of a new operating cycle.

At this time the parts will all have been returned to their respective positions shown in Figs. 1, 4, 5, 7, 9, 11, 14 and 16. The short radius profile 225 of the driving motor cam 223 will have arrived in registry with the switch 222, causing this switch to open and the energization circuit for the driving motor to have been broken. Subsequent operating cycles of the machine will occur in succession in the manner above described so long as the control switch 268 remains closed.

Manual control

Inasmuch as the timing motor switches 238 and 239, Fig. 11, are operable to control energization of the driving motor circuit simply by being alternately closed under control of the timing motor cam 237, it will be apparent that switch means corresponding to the switches 238 and 239 may be actuated manually for controlling energization of the driving motor circuit to cause operation of the driving motor at desired times which may be intervened by rest periods of desired duration. When the driving motor circuit is controlled by the timing motor cam 237 which rotates at selectable constant speeds the rest periods between driving motor circuit energizations will, of course, be of equal length.

Manual control of the driving motor energization circuit is effected by employing the conductors and diagrammatic switch structure shown in Fig. 17 instead of the switches 238 and 239 in Fig. 11, and the timing motor TM. The first step in the change over from the automatic control to the manual control is to disconnect the bridging conductors 260 and 272 from their associated terminals on the receptacle or terminal block 250, and, as explained above, this disconnection of said conductors from their respective terminal block terminals may be expedited by the use of a pronged plug (not shown) having prongs respectively corresponding to the terminals 251—255 and 252—253 between which the conductors 260 and 272 are actually connected and which prongs are readily insertable and withdrawable from respective physical and electrical conductive association with the terminals 251—255 and 252—253. Breaking the electrical connection between the terminals 251—255 deenergizes the timing motor, whereas breaking the electrical connection between the terminals 252—253 dead ends the contacts 241 and 245 of the timing motor switches 239 and 238 to render these switches ineffective.

Following the disconnection of the bridging conductors 260 and 272 the switch controlling apparatus of Fig. 17 is connected with the terminal block by having the cable conductors 276b, 275b, 277a and 271a thereof respectively connected with the terminals 256, 257, 253 and 255 as indicated by the dot-dash lines extending between these conductors and the just mentioned terminals. As previously explained, a detachable association of the conductors 276b, 275b, 277a and 271a with the desired terminals on the block 250 may be expedited by the employment of a multi-pronged plug (not shown) of which the prongs are respectively connected with said conductors and respectively physically and electrically connectible with respective of said terminals.

After the conductors 260 and 272 have been disconnected from their terminals on the block 250 and the conductors in the cable CA have been connected with their terminals on said block, the manually operable switch contact 277x will be manipulatable to close and open driving motor energization circuits cooperably with the driving motor control switches 221 and 222 in the same manner that the timing motor switches 238 and 239 were manipulatable cooperably with the driving motor switches. Preferably the switch comprising the contact 277x is of the "Push-Push" type. One push upon a control button of such a switch would cause the contact 277x to move away from its electrical connection with the contact 242a to the dotted line position where it is in electrical connection with the contact 244a and a succeeding push upon the control button would cause the contact 277x to be returned to the full line position. That is, the contact 277x would shift between the full line and dotted line positions and each time the "Push-Push" switch button is pressed the contact 277x will move to the other of the contacts 242a and 244a than that with which it happens to be associated. A reversing contact 277z is likewise shiftable between electrical connection with a contact 277f and a contact 277r under control of a second button on the "Push-Push" switch. The contacts 277x and 277z are connected in series through a conductor 277y, and as will be presently explained, when the contact 277x is moved into electrical connection with one of the contacts 242a or 244a to energize the driving motor, the motor will run forwardly or backwardly depending upon whether the contact 277z is connected with the contact 277f or 277r; when connected with the contact 277f the motor will rotate forwardly and when connected with the contact 277r it will rotate reversely.

Assuming the switch contacts 277x and 277z to be in the full line positions illustrated in Fig. 17, the driving motor DM will be at rest. This is because the driving motor cam 223 has been rotated to the position shown in Fig. 11 for opening the switch 222. Prior to such opening of the switch 222 the motor upon movement of the contact 277x to the full line position was energized through a circuit including the conductor 269, main switch 268, conductor 267, the driving motor armature, the forward field winding 215, conductor 270, terminal 253, conductor 277a leading into the cable CA, switch contact 277f and 277z, conductor 277y, contacts 277x and 242a, cable conductor 275b, terminal 257, conductor 275, driving motor switch 222 and conductor 218 back to the energy source. When the driving motor had operated long enough to return the projected slide to its respective drum D and to have placed a new slide into the machine projecting section and otherwise conditioned the machine for projecting this slide, the driving motor cam 223 arrived in the position shown in Fig. 11, deenergizing the driving motor energization circuit. So long as the switch contact 277x is allowed to remain connected with the contact 242a the driving motor will remain at rest while the slide in the projecting section of the machine is being projected. When the slide has been projected for a period which may be determined by the length of time the operator wishes to discourse about the projected subject, he will press the aforesaid "Push-Push" button for throwing switch 277x to the dotted line position in electrical connection with the contact 244a. Thereupon an energization circuit for the driving motor will be established from one side of the energy source over the conductor 269, main switch 268, conductor 267, the driving motor armature, the forward field winding 215, conductor 270, terminal 253, cable conductor 277a, switch contacts 277f and 277z, conductor 277y, contacts 277x and 244a, cable conductor 276b, terminal 256, conductor 276, driving motor switch 221 and the conductor 218 back to the side of the energy source of opposite polarity. Upon the establishment of this energizing circuit for the driving motor it will rotate for driving the machine cam shaft 41 and the driving motor cam 223 through 180° for effecting the hereinabove described operations of the machine parts for transferring the projected slide from the machine projecting section into its respective drum and for transferring a new slide from the other drum into the projecting section and otherwise conditioning the machine for projecting the new slide. Upon the completion of this 180° rotation of the driving motor cam 223 the long radius profile 226 of said cam will cause the switch 222 to be closed and the switch 221 of the just described energization circuit to be opened and thus cause the driving motor to come to rest. Alternate energization of the above described energization circuits for the driving motor is obtainable to cause the machine to run through successive operating cycles simply by alternately throwing the switch contact 277x first to one of the two contacts 242a and 244a and then to the other.

Sometimes it will be desirable to run the driving motor in the reverse direction for reversing the operation of the machine parts whereby the slide holding drums D will be advanced in the reverse direction and the slides will be displaced in the reverse order to that taking place in the operations of the machine thus far described. It will be observed in Figs. 3, 5 and 7 that the actuating cams 204, 80 and 150 driven by the main cam shaft 41 are symmetrical so that they may be driven in either direction for causing operation of their respectively controlled parts coordinately with the parts controlled by each of the other cams. The cam 80 has symmetrically arranged cam rise profiles 100 and 99 either of which is slidable along the faces 93, 94, 95 and 96 of the cam follower 81 for imparting movement to this cam follower. In the description hereinabove of the operation of the cam 80 and its follower 81 the cam was described as rotating clockwise, Fig. 5, to cause the rise 100 to successively engage the cam faces as 93 of the follower whereby said follower was given a clockwise revolving movement with respect to the axis of rotation of the cam 80. However, as the cam 80 is rotated in the counter-clockwise rotation, the cam rise profile 99 thereon will operate cooperably with the faces as 93 of the follower 81 in successive but reverse order of association whereby said follower will revolve counter-clockwise with respect to the cam axis. This counter-clockwise revolving of the cam follower will cause the pin 83 to advance the drum D with which it is associatable in the opposite direction to which it was advanced by this pin 83 when the follower 81 was revolved clockwise, and, the pin 82 upon the follower will also be manipulated for rotating its associated drum D in the opposite direction heretofore described.

In the operation of the cam 150 in Fig. 7, when the cam is rotated counter-clockwise instead of clockwise by reverse rotation of the driving motor DM, the rise profile 153 will effect the oscillative movement of the follower 157 instead of the rise profile 154, to coordinate the movement of the slide picker device PD, which is moved under control of the follower 157, coordinately with the advance of the drums D in their reverse direction under the influence of the reversely driven cam follower 81.

Reverse rotation of the driving motor DM is obtainable by throwing the switch contact 277z from the full line position shown in Fig. 17 to the dotted line position in conducting relation with the contact 277r. This movement of the contact 277z against the contact 277r is effective for connecting the reverse field winding 216, Fig. 11, in series with the movable switch contact 277x, Fig. 17, the circuit portion establishing the series relation of the field winding 216 with the movable contact 277x including the conductor 277y, said contact 277z, contact 277r, cable conductor 271a, terminal 258 and the conductor 271. Inasmuch as throwing the switch 277z against the contact 277r merely substitutes the reverse field winding 216 in the motor energization circuit in lieu of the forward field winding 215, and inasmuch as the driving motor cam 223 is in the position for causing the switch 222 to be opened and the switch contact 277x is disengaged from the contact 244a, the placing of the movable contact 277z against the contact 277r will not effect energization of the motor energizing circuit. Energization of the driving motor circuit will not occur, as when the contact 277z was against the contact 277f, until the "Push-Push" switch control is manipulated for throwing the contact 277x against the contact 244a. When this occurs the energization of the driving motor for reverse rotation will be through the circuit including the conductor 269, main switch 268, conductor 267, the driving motor armature, reverse field winding 216, conductor 271, terminal 258, cable conductor 271a, contacts 277r and 277z, conductor 277y, contacts 277x and 244a, cable conductor 276b, terminal 256, conductor 276, switch 221 and the conductor 218 back to the energy source. The machine is then driven by the reversely rotating motor to replace into the projecting section of the machine a previously shown slide which it is desired to again examine. As when the forward field winding 215 is connected for energization by the throwing of the switch contact 277x, when the contact 277z is against the contact 277f, the driving motor cam 223 will rotate 180° before opening the switch 221 whereupon the motor will stop. Subsequent energizations of the driving motor are effected by alternately moving the contact 277x between the fixed contacts 244a and 242a to cause the machine to "back up" for the showing of as many slides in reverse order as is desired.

In addition to being capable of continuous and automatic operation, the moving parts of the machine in effecting such operation are inherently quiet in the performance of their functions, and, in this respect the principal parts are quiescent during slide projection periods when the absence of noise is particularly desirable.

Another advantage of the machine concerns the efficient use of two slide holders whereby a single slide picker device is operable to transfer the slides from each slide holder and back again. Moreover, the alternate transfer of slides from the holders and concurrent return of the projected slides to their respective holders results in a large capacity machine in which no adjustment is necessary before starting the projection of the slides on the second holder. Also, after the series of slides has been run through they will be in their same relative positions in the holders as at the start of the exhibition, so the machine can be left running indefinitely to project the series over and over again.

Another important advantage of the apparatus is its adaptability to be employed as a fully automatic machine under control of the timing motor or by the manual control, and the ease with which the change can be made from the automatic to the manual control. It should also be noted that when the apparatus is operating under the manual control that the projecting period may be varied from an instantaneous period to one of indefinite length. By throwing the manually controlled switch contact 277x to the other of the two contacts 242a or 244a immediately upon the machine performing the operation of withdrawing a slide from a slide projecting section and inserting a new slide into that section, the driving motor DM can be caused to drive the slide holder drums D forwardly or backwardly, depending upon the position of the switch contact 277z, for quickly bringing into the projecting section of the machine a slide which may be disposed some distance circumferentially of its drum from the slide transfer station associated with that drum.

While we have thus described our invention, we do not wish to be limited to the precise details described, as changes may be readily made without departing from the spirit of our invention, but having thus described our invention, we claim as new and desire to secure by Letters Patent the following:

1. In a slide projector machine wherein there are parts driven through a cycle pursuant to one portion of which a slide is transferred from a slide transfer position at a slide holder into a projecting section of the machine and a light beam transmitting the slide subject is thereafter projected from the machine, and pursuant to a second portion of which cycle the slide is returned to the holder and the latter is then operated to dispose a succeeding slide in said transfer station preparatory to a repetition of said cycle; the combination of an electric driving motor operable to drive said parts, an electric timing motor energized independently of said driving motor, an electric circuit comprising a plurality of circuit portions in control of the driving motor and of which either is conditioned by closing to cause operation of the driving motor, each of said circuit portions including a driving motor switch and a timing motor switch and each of said portions being open when either of its switches is open and being closed when both of its switches are closed, timing motor switch actuating means operable according to the speed of said timing motor to cause alternate closing of the timing motor switches, and driving motor switch actuating means operable coordinately with said motor to cause the opening of one of the driving motor switches upon the completion of one of said cycle portions while causing the closing of the other, and to cause the opening of said other driving motor switch upon the completion of the second cycle portion while causing the closing of said one driving motor switch, whereby upon the completion of each of said cycle portions the respective circuit portion for the driving motor will be opened to stop the motor and the other circuit portion will be conditioned for closing by the closing of its respective timing motor switch at a time determined by the speed of the timing motor.

2. In a slide projector machine wherein there are parts driven through a cycle pursuant to one portion of which a slide is transferred from a slide transfer position at a slide holder into a projecting section of the machine and a light beam transmitting the slide subject is thereafter projected from the machine, and pursuant to a second portion of which cycle the slide is returned to the holder and the latter is then operated to dispose a succeeding slide in said transfer station preparatory to a repetition of said cycle; the combination of an electric driving motor operable to drive said parts, an electric timing motor energized independently of said driving motor, and an electric circuit including switch means manipulatable to condition said circuit with respect to its energization for causing energization of the driving motor so said motor is effective for driving said machine parts and being also manipulatable to terminate such condition, said switch means being manipulatable under control of the driving motor to terminate such circuit condition upon the completion of each of said cycle portions and thus cause the driving motor to stop, and said switch means being manipulatable under control of said timing motor to recondition said circuit at a predetermined time after such stopping of the driving motor to cause execution of the succeeding cycle portion.

3. In a machine of the class described including an axial projecting beam section into which slides are transferable from transfer stations at opposite of its sides, a slide picker device reciprocal between said transfer stations transversely of the projecting section and operable in each reciprocal sweep to transfer into the projecting section a slide from the transfer station of departure and to return to the station of destination a slide from the projecting section, a rotatable drive member disposed between said stations opposite a third side of the projecting section, said drive member being rotatable about an axis generally perpendicular to the projecting section axis and having a drive imparting portion displaced orbitally about such axis during rotation of the member, and means drivingly connecting said slide picker device with said drive imparting portion of the drive member in a manner that imparts to said device a reciprocal displacement constituting an amplification of the throw of such portion, comprising a follower disposed on the side of said projecting section with said drive member, said follower having a first portion spaced in one direction from said drive member axially of the projecting section and displaceable laterally of said section in the direction of reciprocation of the picker device, a second portion spaced in the opposite direction from the drive member and pivotally mounted to facilitate said displacement of the first portion, and an intermediate portion of the follower being operably associated with the orbitally movable drive member portion for receiving driving force therefrom to cause such displacement of the first follower portion, and a lever member on the side of the projecting section with the follower, said lever extending axially of the projecting section and having a first portion between the first and second portions of the follower that is drivingly connected with the picker device and movable reciprocally therewith transversely of the projecting section, said lever having a second portion spaced oppositely to the first portion thereof axially of the projecting section with respect to said laterally displaceable portion of the follower and that is pivotally mounted to facilitate such transverse movement of the first lever portion, and said lever having an intermediate portion pivotally connected with the laterally movable portion of the follower whereby the latter cooperates with the pivotally mounted second portion of the lever in imparting such transverse movement to the first lever portion for driving the picker device.

4. In a machine of the class described including an axial projecting beam section into which slides are transferable from transfer stations at opposite of its sides, slide holders at said sides of the projecting section and rotatable about a substantially common axis normal to and spaced laterally from a third side of said projecting section, said holders each having means for releasably holding thereon a plurality of slides distributed circumferentially thereabout at such radial distance as to be carried successively into registry with said transfer stations pursuant to rotation of the carriers, cam-driven means between said slide holders at a position spaced from said third side of the projecting section in the same direction as the holder axis and operable for alternately rotatively advancing said holders to dispose the slides thereon in registry with the transfer stations as aforesaid, a cam shaft extending perpendicularly to the projecting section upon said third side thereof between said holders, a cam on and driven by said shaft for operably driving said cam-driven means, a cam-driven slide picker device reciprocal between said transfer stations transversely of the projecting section and operable in each reciprocal sweep to transfer into the projecting section a slide from the transfer station of departure and to return to the transfer station of destination a slide from the projecting section, and a second cam on and rotatable with said shaft for operably driving said picker device in such timed relation with the drums that each slide is transferred into the projecting section and returned to its transfer station prior to a succeeding advance of its drum for advancing a new slide to such station.

5. In a machine of the class described including an axial projecting beam section into which slides are transferable from stations at opposite sides of said section to have their subject projected by a beam in said section, a power shaft between said stations opposite a third side of said section and with its axis substantially normal to the projecting section axis, means operated from said shaft for transferring slides from said stations into the projecting section and back to said stations, a shutter member reciprocal transversely of the projecting section to and from a position of registration therewith along a path of movement generally parallel with the power shaft, a pivoted member pivotally mounted for oscillative movement about an axis on said third side of the projecting section that is spaced axially of said projecting section from the power shaft and that is substantially perpendicular to the axis of said shaft, arms oscillatable with and projecting from said pivoted member respectively at said opposite sides of the projecting section, said arms being operably connected with opposite edges of the shutter member to move the same into registry with the projecting section when the pivoted member is pivoted in one direction and to move said shutter member out of such registry when pivoted in the opposite direction, and drive means on and rotatable with said power shaft operably connected with said pivoted member for oscillating the same during rotation of the power shaft, and said drive means being further operable to oscillate said pivoted member for operating the shutter in such timed relation with the slide transfer means that the shutter is in registry with the projecting section during movement of a slide into or from the projecting section and is out of such registry while a slide is at rest in the projecting section.

6. In a machine of the class described including an axial projecting beam section into which slides are transferable from transfer stations at opposite of its sides, slide holders at said sides of the projecting section and rotatable about a substantially common axis normal to and spaced laterally from a third side of said projecting section, said holders each having means for releasably holding thereon a plurality of slides distributed circumferentially thereabout at such radial distance as to be carried successively into registry with said transfer stations pursuant to rotation of the carriers, a rotatable power shaft extending perpendicularly to the projecting section upon said third side thereof between said holders, holder driving means between said holders on the third side of said projecting section and operably connected with and driven by said shaft for alternately rotatively advancing said holders to dispose the slides thereon in registry with the transfer stations as aforesaid, a slide picker device on said third side of the projecting section and drivingly connected with said shaft for reciprocation thereby between said transfer stations and operable in each reciprocal sweep to transfer into the projecting section a slide from the station of departure and to return a slide from the projecting station to the transfer station of destination, a shutter member reciprocal transversely of the projecting section to and from a position of registration therewith along a path generally parallel with the power shaft and operably connected with said power shaft to be driven thereby in effecting said reciprocal movement, and the connections of said holder driving means, said slide picker device and said shutter member with the power shaft being coordinately operable in such relation that each slide transferred by the picker device into the projecting section is returned to its transfer station prior to a succeeding advance of its drum and that the shutter is in registry with the projection section during movement of the slides in or out of the projecting section and is out of such registry while a slide is at rest in the projecting section.

7. In a slide projector machine, the combination as recited in claim 1 and further characterized in that manually adjustable speed controlling means operable on said timing motor is provided.

8. In a slide projector machine, the combination as recited in claim 2 and further characterized in that a manually adjustable variable resistance connected in circuit with said timing motor for controlling the speed thereof is provided.

9. In a slide projector machine including a projection section in which slides are transferable from transfer stations at opposite of its sides, the combination of slide holders at respective of said sides and advanceable in corresponding paths to bring slides carried in sequence thereon to said transfer stations, and means for intermittently advancing said slide holders comprising an advancing member extending between said slide holders and mounted for movement in a rectangular orbital path disposed to provide reciprocation of said advancing member both lineally and transversely of said slide holder paths and provided at the opposite ends thereof with oppositely disposed advancing formations alternately engageable with cooperating series of advancing formations respectively on said slide holders by reciprocation of said advancing member transversely of said slide holder paths and provided intermediately thereof with two pairs of parallel cam engageable surfaces arranged angularly about and facing an axis generally normal to said orbital path and a cam mounted for rotation on said axis and operable on said cam engageable surfaces to effect movement of said advancing member in said orbital path.

10. In a slide projector machine including a projection section in which slides are transferable from transfer stations at opposite of its sides, the combination of slide holders at respective of said sides and advanceable in corresponding paths to bring slides carried in sequence thereon to said transfer stations, and means for intermittently advancing said slide holders comprising an advancing member extending between said slide holders and mounted for movement in a rectangular orbital path disposed to provide reciprocation of said advancing member both lineally and transversely of said slide holder paths and provided at the opposite ends thereof with oppositely disposed advancing formations alternately engageable with cooperating series of advancing formations respectively on said slide holders by reciprocation of said advancing member transversely of said slide holder paths and provided intermediately thereof with two pairs of parallel cam engageable surfaces arranged angularly about and facing an axis generally normal to said orbital path and a cam mounted for rotation on said axis and operable on said cam engageable surfaces to effect movement of said advancing member in said orbital path, a holder pilot extending between said slide holders and mounted for reciprocation transversely of said slide holder paths and provided at the opposite ends thereof with oppositely disposed pilot formations alternately engageable with said series of advancing formations respectively on said slide holders, and a motion reversing operative connection between said advancing member and holder pilot and operative to reciprocate said holder pilot transversely of said slide holder paths in reverse relation with reciprocation of said advancing member transversely of said slide holder paths to engage said holder pilot with said slide holders in alternation with engagement of said advancing member therewith.

11. In a slide projector machine including a projection section in which slides are transferable from transfer stations at opposite of its sides, the combination of substantially coaxial slide holders at respective of said sides and rotatable about their axis to bring slides carried in sequence angularly thereon to said transfer stations, and means for intermittently advancing said slide holders comprising an advancing member extending between said slide holders and mounted for angular movement substantially about and for movement substantially parallel to said axis and thus mounted for movement in a rectangular orbital path providing reciprocation of said advancing member both lineally and transversely of the rotational movement of said slide holders and provided at the opposite ends thereof with oppositely disposed advancing formations alternately engageable with cooperating series of advancing formations respectively on said slide holders by reciprocation of said advancing member transversely of said slide holder movement and provided intermediately thereof with two pairs of parallel cam engageable surfaces arranged angularly about and facing an axis generally normal to said orbital path and a cam mounted for rotation on said last mentioned axis and operable on said cam engageable surfaces to effect movement of said advancing member in said orbital path.

12. In a slide projector machine including a projection section in which slides are transferable from transfer stations as opposite of its sides, the combination of substantially coaxial slide holders at respective of said sides and rotatable about their axis to bring slides carried in sequence angularly thereon to said transfer stations, and means for intermittently advancing said slide holders comprising an advancing member extending between said slide holders and mounted for angular movement substantially about and for movement substantially parallel to said axis and thus mounted for movement in a rectangular orbital path providing reciprocation of said advancing member both lineally and transversely of the rotational movement of said slide holders and provided at the opposite ends thereof with oppositely disposed advancing formations alternately engageable with cooperating series of advancing formations respectively on said slide holders by reciprocation of said advancing member transversely of said slide holder movement and provided intermediately thereof with two pairs of parallel cam engageable surfaces arranged angularly about and facing an axis generally normal to said orbital path and a cam mounted on said last mentioned axis and operable on said cam engageable surfaces to effect movement of said advancing member in said orbital path, a holder pilot extending between said slide holders and mounted for reciprocation transversely of said slide holder movement and provided at the opposite ends thereof with oppositely disposed pilot formations alternately engageable with said series of advancing formations respectively on said slide holders, and an intermediately pivoted arm having its opposite ends respectively operatively connected with said advancing member and said holder pilot and operative to reciprocate said holder pilot transversely of said slide holder movement in reverse relation with reciprocation of said advancing member transversely of said slide holder movement to engage said holder pilot with said slide holders in alternation with engagement of said advancing member therewith.

BRUNO STECHBART.
EDWARD E. STRAUSS.